(12) United States Patent
Pellegrinetti et al.

(10) Patent No.: US 11,655,661 B2
(45) Date of Patent: May 23, 2023

(54) ANTI-PINCH METHOD FOR AN APPARATUS FOR AUTOMATIC MOVEMENT OF SLIDING WINDOWS IN A MOTOR VEHICLE, IN PARTICULAR A POWER-WINDOW APPARATUS, AND CORRESPONDING DEVICE

(71) Applicant: Automotive Lighting Italia S.p.A., Turin (IT)

(72) Inventors: Alessio Pellegrinetti, Turin (IT); Andrea Novello, Turin (IT); Andrea Bussi, Turin (IT); Carlo Vai, Turin (IT); Carlo Gallo, Turin (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 0 days.

(21) Appl. No.: 16/481,780

(22) PCT Filed: Feb. 15, 2018

(86) PCT No.: PCT/IB2018/050929
§ 371 (c)(1),
(2) Date: Jul. 29, 2019

(87) PCT Pub. No.: WO2018/158647
PCT Pub. Date: Sep. 7, 2018

(65) Prior Publication Data
US 2019/0390500 A1    Dec. 26, 2019

(30) Foreign Application Priority Data

Mar. 1, 2017  (IT) .................. 102017000023222

(51) Int. Cl.
*H02P 27/05* (2006.01)
*H02P 25/10* (2006.01)
(Continued)

(52) U.S. Cl.
CPC ............ *E05F 15/41* (2015.01); *E05F 15/697* (2015.01); *H02P 7/0094* (2013.01); *E05Y 2900/55* (2013.01)

(58) Field of Classification Search
CPC ............ H02H 3/38; H02H 6/005; H02P 7/28
See application file for complete search history.

(56) References Cited

U.S. PATENT DOCUMENTS

| 7,372,224 | B2* | 5/2008 | Gregori | ..................... H02P 7/29 318/272 |
| 2003/0137265 | A1* | 7/2003 | de Frutos | ............. H02H 7/0851 318/468 |

(Continued)

OTHER PUBLICATIONS

Transmittal of the International Search Report and Written Opinion of the International Searching Authority for PCT International Application No. PCT/IB2018/050929 dated Jun. 5, 2018.

*Primary Examiner* — Kawing Chan
*Assistant Examiner* — Charles S Laughlin
(74) *Attorney, Agent, or Firm* — Howard & Howard Attorneys PLLC (57) ABSTRACT

An anti-pinch method for an apparatus for automatic movement of sliding windows including the steps of: receiving at least one electrical quantity ($e_a$, $i_a$) of the motor (M); counting ($R_c$) oscillation periods ($R_d$) of the at least one electrical quantity ($e_a$, $i_a$); calculating an angular position ($\theta(t)$) of the motor (M) as a function of the number of periods ($R_c$) of the electrical quantity ($e_a$, $i_a$); calculating a position of the window (F) as a function of said angular position ($\theta(t)$) of the motor (M); and reversing the direction of rotation of the motor (M) if the position of the window (F) falls within an anti-pinch zone (APZ) and the movement of the motor (M) is at least partially blocked.

7 Claims, 10 Drawing Sheets

(51) Int. Cl.
*E05F 15/41* (2015.01)
*E05F 15/697* (2015.01)
*H02P 7/00* (2016.01)

(56) References Cited

U.S. PATENT DOCUMENTS

| | | | |
|---|---|---|---|
| 2010/0033064 A1 | 2/2010 | Tanaka et al. | |
| 2011/0262112 A1* | 10/2011 | Tanaka | H02K 11/20 388/811 |
| 2011/0270558 A1 | 11/2011 | Knezevic et al. | |
| 2015/0123591 A1* | 5/2015 | Inoue | H02P 8/12 318/696 |

* cited by examiner

ANTI-PINCH METHOD FOR AN APPARATUS FOR AUTOMATIC MOVEMENT OF SLIDING WINDOWS IN A MOTOR VEHICLE, IN PARTICULAR A POWER-WINDOW APPARATUS, AND CORRESPONDING DEVICE

CROSS-REFERENCE TO RELATED APPLICATIONS

The present application is a National Stage of International Patent Application No. PCT/IB2018/050929, filed on Feb. 15, 2018, which claims priority to and all the benefits of Italian Patent Application No. 102017000023222, filed on Mar. 1, 2017, both of which are hereby expressly incorporated herein by reference in their entirety.

BACKGROUND OF THE INVENTION

1. Field of the Invention

The present invention relates to an anti-pinch method for an apparatus for automatic movement of sliding windows in a motor vehicle, in particular a power-window apparatus, including a d.c. electric motor that moves a window so that it slides along guides, said method comprising the steps of receiving one or more electrical quantities of the electric motor, counting the oscillation periods of the electrical quantities, calculating the position of the window as a function of the angular position of the motor calculated through the number of oscillation periods previously calculated, and, finally, reversing the direction of rotation of the motor if the position of the window falls within an anti-pinch zone and simultaneously the movement of the motor is partially or totally block.

The above techniques are described herein with specific reference to power-window apparatuses of a motor vehicle, but may also refer to other motor-drives for windows, or equivalent elements, such as panels, along guides provided on the vehicle, such as an openable sun roof, which run the risk of causing pinching.

Power-window apparatuses are devices constituted by an electro-mechanical system by means of which displacement of a window is brought about in just two directions in space by constraining the window, on two sides, to a path constituted by two parallel guides. The window slides along the two guides with the aid of a system of levers driven by a d.c. electric motor.

The direction of rotation of the rotor of the electric motor, fitted on which is a shaft connected to the aforesaid system of levers, determines the direction of movement of the window.

Semiautomatic or automatic operation of the power-window apparatus inserted in the door of a motor vehicle envisages the presence of a d.c. electric motor (where displacement of the window depends directly upon the pressure exerted on a pushbutton and ceases as the pressure ceases), in particular controlled automatically by an electronic circuit. In the automatic operating mode, a so-called anti-pinch safety function is usually envisaged. In the automatic mode, in fact, displacement of the window is a consequence of pressure exerted on a pushbutton connected to an electronic circuit that controls operation of the electric motor. The electronic control circuit interprets, in addition to the information "pushbutton pressed/pushbutton released", also the boundary conditions, such as the current in the motor, the value of which increases instantaneously at the instant when movement of the motor is blocked following upon arrest of the window, either because the end-of-travel has been reached or because an obstacle has been encountered along the path of the window.

Hence, in the automatic mode, the power-window system is able to evaluate conditions regarding safety, and it is thus possible to introduce an anti-pinch function, which consists in reversal of the direction of upward motion of the window when an obstacle is encountered or when the motion proves problematical, for example in the case where a person's fingers happen to be in the way and hence risk getting pinched (with evident traumatic consequences) between the window that is going up and the top edge of the power-window frame.

The reliability and high sensitivity of the anti-pinch system must enable automatic reversal of motion of the window in the presence of an obstacle; the system is hence in this regard calibrated to respond positively to stringent testing conditions.

In particular, the standards (FMVSS118 (USA)—74/60/ EEC (Europe)) define as anti-pinch zone an area comprised between 4 mm and 200 mm beneath the top end-of-travel (or top edge of the power-window frame). The tests to which the system is subjected envisage that the window, in the presence of an obstacle, must not exert a force higher than 100 N with objects that can have a deflection ratio between 5 N m and 20 N m.

Figure 11:
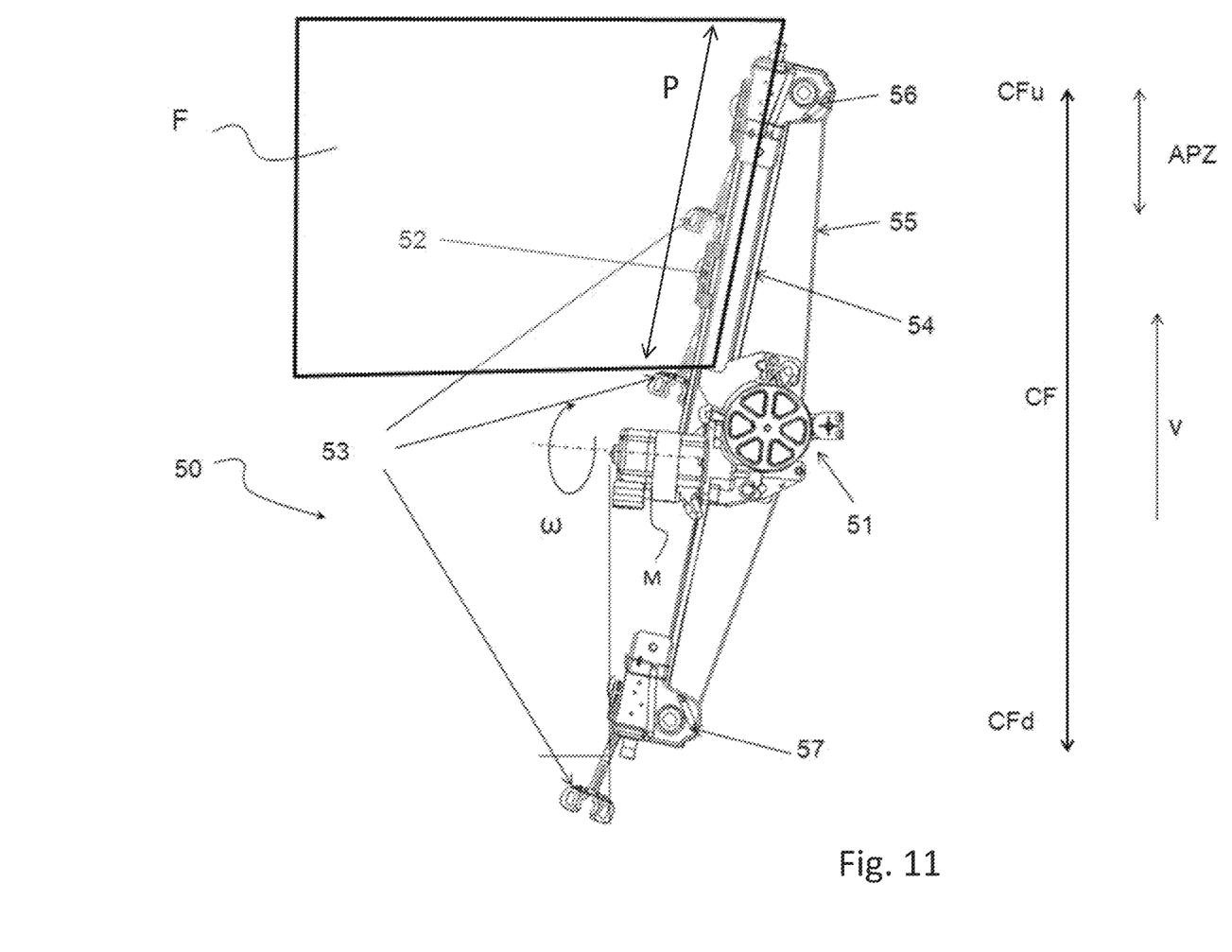
FIG. 11 illustrates a principle diagram of a power-window apparatus for a motor vehicle that is able to implement the method according to the invention.

FIG. 11 is a schematic representation of an example of a power-window apparatus designated as a whole by the reference number 50. The apparatus 50 comprises a motor M that turns with an angular velocity $\omega$ about an axis of rotation and, through a motor reducer 51, actuates a sliding cable 55, which, via two sliding rollers 56 and 57 set at the bottom end 57 and the top end 56 of a path of travel CF of a window F between a top end-of-travel CFu and a bottom end-of-travel CFd, moves a window engagement element 52, connected to the window F, to get the aforesaid window to slide in a guide 54 along a path designated by P (for simplicity indicated as being purely vertical in the drawing). The window F moves along the path P with a linear velocity v, which in general is directly proportional to the angular velocity $\omega$ via a constant that is determined, among other parameters, by the reduction ratio of the motor reducer 51. Designated by 53 are elements for engagement of the apparatus 50 to the door. Denoted by APZ is an anti-pinch zone defined along the path P with respect to the top end-of-travel CFu.

Simple power-window apparatuses are known that do not comprise position sensors, but process parameters such as the resistivity of the rubber weatherproofing set between the glass of the window and the slide guides, which, with an appropriate calibration of the points of measurement, varies as a function of the position of the window. However, the precision that may be achieved, which is the most important parameter for an effective anti-pinch system, is not very high.

2. Description of the Related Art

It is known to operate in a more precise way by storing, using an electronic control circuit, the position of the window after an appropriate calibration, exploiting the top end-of-travel and bottom end-of-travel, via integration of a sensor (the type of sensor most widely used for such applications is a Hall-effect sensor, with an encoder mounted on the printed circuit, which is in turn arranged in the proximity of a disk that is fitted on the motor shaft and contains the magnets), and processing, via the electronic circuit, a series of parameters (both parameters characteristic of the electric motor itself and parameters linked to the circuit, such as the value of current that varies as a function of friction) so as to evaluate the friction of the system in order to adapt to possible variations, not only ones occurring in the short term but also those due to ageing. This system is more precise, but requires the exact knowledge of the electrical parameters of the motor used during calibration of the system; i.e., for instance, any possible replacement of the electric motor must be made with a motor of the same model or with the same characteristics; otherwise, the initial characteristics and performance are not guaranteed. Furthermore, the system requires a specific sensor for detecting the position of the window.

Moreover, known anti-pinch methods for power-window apparatuses, which comprise receiving an electrical quantity of the motor, such as the armature current, counting its oscillation periods, and calculating the angular position of the motor as a function of the number of periods counted so as to calculate a position of the window as a function of said angular position of the motor, and reversing the direction of rotation of the motor if the position of the window falls within an anti-pinch zone and the movement of the motor is at least partially blocked.

The above methods may, however, present drawbacks in carrying out a continuous control of the position in all the operating steps of the motor of the power window.

SUMMARY OF THE INVENTION

The object of the present invention is to provide an improved method that will enable exact determination of the position of the window along its path without the aid of external sensors, will be independent of the typical (and parasitic) parameters of the system, in particular of electric motors, and will make it possible to perform a continuous control of the position more easily in all the operating steps of the motor of the power window.

According to the present invention, the above object is achieved thanks to an anti-pinch method for an apparatus for automatic movement of sliding windows in a motor vehicle, in particular a power-window apparatus, and a corresponding automatic electronic power-window apparatus comprising a d.c. electric motor, as well as a corresponding anti-pinch device which present the characteristics recalled in a specific way in the ensuing claims.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

In brief, the solution according to the invention in general envisages exploitation, in the power-window apparatus, of the electrical quantities of the d.c. motor, in particular the back electromotive force and the armature current from the motor, to extract information on the position of the rotor of the motor, and reversing, on the basis thereof, the direction of rotation of the motor in the case where the movement of the motor is blocked.

In order to drive a motor M it is envisaged to resort, for example, to the PWM (Pulse Width Modulation) mode. The PWM mode of supply of a d.c. motor is in itself known to the person skilled in the sector, and for the electric motor M envisages, given a total period $t_{tot}=t_1+t_2$, applying to the terminals A, B of the motor M a voltage $v=v_a$ for a period equal to a first ON time $t_1$ and applying a zero voltage, $v=0$, for a subsequent OFF period $t_2$.

By controlling the values of the ON time $t_1$ and OFF time $t_2$, rotation of the motor M can be kept constant since, during the period when a voltage is not applied to its terminals, the motor M tends to continue its motion on account of the inertia of the system.

The electric motor M is a d.c. electric motor controlled by an electronic circuit that is equipped with microcontroller and implements a specific software strategy, which enables and controls sliding, in two directions, of a window surface (glass or similar material) constrained in its path by two parallel guides. Sliding in two directions is controlled by the pressure exerted on electromechanical pushbuttons. The above surface may be the glass of a window moved by the power-window system located in the door of a motor vehicle with anti-pinch function or else the sun roof that can be electrically slid open and closed.

Figures 1, 2:
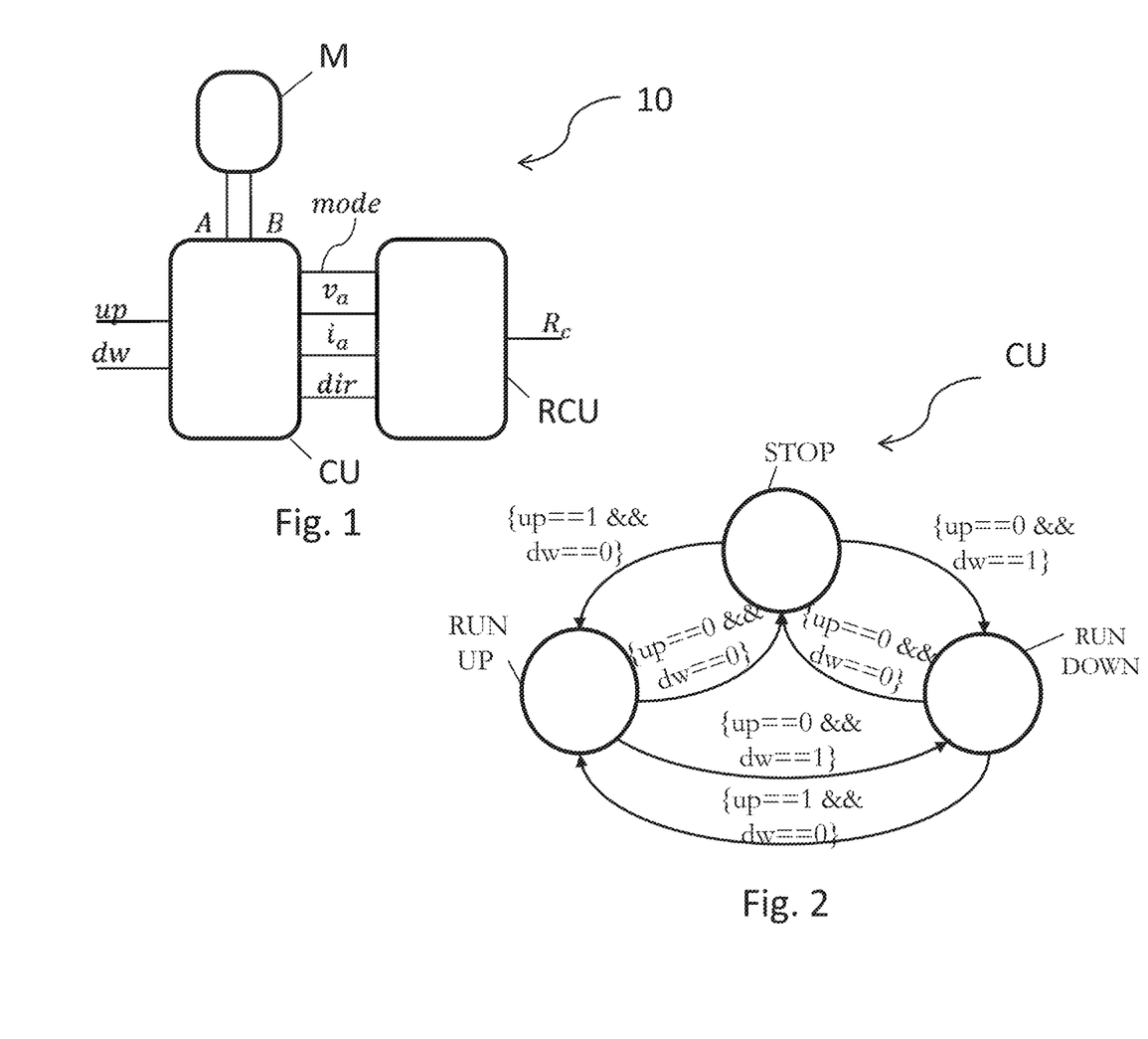
FIG. 1 is a block diagram of a control circuit of an apparatus for automatic movement of sliding windows that is able to implement the method according to the invention.
FIG. 2 represents the control logic of a motor operating in said apparatus.

Illustrated in FIG. 1 is a block diagram provided by way of example of a possible anti-pinch circuit device 10 for controlling an apparatus for automatic movement of a window F coupled to a motor M. Designated by the reference M is a d.c. electric motor, for instance, of a power-window apparatus, coupled to an object to be displaced, for example a window. The motor may, for instance, be an electric motor of a PMDC (Permanent-Magnet DC) type. Denoted by A and B are terminals of the electric motor M.

The block designated by CU is a control unit, having the function of:
- acquiring signals of request for movement of the motor M for closing the window F, i.e., for sliding it up, up, and for opening the window F, i.e., for sliding it down, dw;
- driving the motor M through an armature voltage $v_a$ applied to the terminals A and B across the motor M, according to the value of the movement-request signals up, dw, generated by the request for movement of the motor made by a user; and
- controlling an operation of selection of electrical quantities between an armature current $i_a$ and a back electromotive force $e_a$, and controlling a ripple-counter unit RCU via the operating-mode signal mode and the signal of direction of movement of the motor dir, which are generated by the control unit CU.

In one or more embodiments, the ripple-counter unit RCU receives at input, from the control unit CU, the electrical quantities, namely, the armature current $i_a$ and the back electromotive force $e_a$, which is acquired at the same terminals A, B as those to which the armature voltage $v_a$ is applied, as well as the operating-mode signal mode and direction-of-movement signal dir. The control unit RCU, on the basis of these quantities and input signals, produces, at output, a signal $R_c$ that represents a number used for calculating the angular position of the motor, proportional to the number of oscillations of an electrical quantity.

FIG. 2 illustrates a diagram describing in greater detail the operations of the above control unit CU for driving the motor M as managed by the closing signal up and the opening signal dw. In particular, FIG. 2 can represent a finite-state machine with three possible states: RUN UP where the window is wound up, RUN DOWN where the window is wound down, and finally STOP, where the motor is turned off or stopped. In one or more embodiments, the control unit CU generates the two signals, namely, the operating-mode signal mode and direction-of-movement signal dir, according to the operating state.

The operation may start, for example, from a state STOP. In this state, the signal mode has the value MV (i.e., the back electromotive force in the calculation of the period of the oscillations is selected), whereas the value of the signal dir is not changed.

The state machine exits from the state STOP if the signals assume the following values:
- up=1 AND dw=0: in this case, the machine enters a state RUN UP where the window is wound up; and
- up=0 AND dw=1: in this case, the machine enters a state RUN DOWN where the window is wound down.

The state RUN UP in turn exemplifies the movement of closing of a window that conventionally coincides with a movement upwards. The signals mode and dir, in this state, assume the values MI/current and −1, respectively.

The state machine exits from the state RUN UP if the values up and dw assume the following values:
- up=0 AND dw=0: in this case, the machine returns to the state STOP; and
- up=0 AND dw=1: in this case, the machine enters the state RUN DOWN.

Finally, the state RUN DOWN exemplifies the movement of opening of a window that conventionally coincides with a movement downwards. The signals mode and dir, in this state, assume the values MI/current and 1, respectively.

The state machine exits from the state RUN DOWN if the signals up and dw assume the following values:
- up=0 AND dw=0: in this case, the machine enters the state STOP; and
- up=1 AND dw=0: in this case, the machine returns to the state RUN UP.

It should be noted that the above values of the signals are perfectly arbitrary and any alternative form of driving can be used, for example, with the movement upwards of the window that occurs when the signal dw is equal to −1 and the signal up is equal to 0. Likewise, the signals mode and dir can change their own value on the basis of the operating state and conventions adopted according to one or more embodiments, for example, in the case where the origin of the system were to be in the point of maximum opening of the window instead of in the point of maximum closing.

The state machine may be implemented in a microprocessor, for example the microprocessor 21 illustrated hereinafter in FIG. 8, which generates the control signals DS, or else in another microprocessor or microcontroller. The microprocessor or microcontroller may likewise generate the signals mode and dir as its outputs, receiving for example, on its inputs, electrical quantities of the motor M, such as armature voltages and currents, so as to verify in which state, STOP, RUN UP, or RUN DOWN, the motor M is. Of course, other types of control module or circuit for generating the signals mode and dir are possible.

Figure 3:
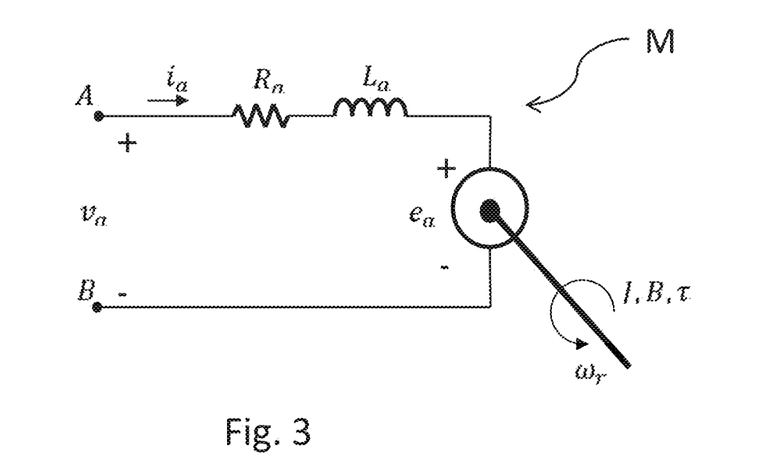
FIG. 3 represents the equivalent electrical model of a d.c. electric motor.

A theoretical electromechanical representation of an electric motor M is exemplified in FIG. 3. The terminals A and B receive, as in FIG. 1, the voltage $v_a$ used for driving the motor M, whereas the armature current is represented by the reference $i_a$.

$R_a$ is an armature resistance of the motor M, $L_a$ is an armature inductance of the motor M, and $e_a$ is a back electromotive force (BEMF) of the electric motor M, which is proportional to an angular velocity of the rotor ωr.

The electric motor M can be represented by the following pair of differential equations:

$$v_a = R_a i_a + L_a \frac{di_a}{dt} + e_a \qquad (1)$$

$$J \frac{d\omega_r}{dt} = K_t i_a - B\omega_r - \tau_r \qquad (2)$$

where J, $K_t$, B, and $\tau_r$ are, respectively, the moment of inertia of the rotor, the mechanical constant of the motor, the friction of the rotor shaft, and the external torque applied on the rotor.

As may be seen from Eq. (1), the voltage $v_a$ applied is divided into a back electromotive force $e_a$, a voltage drop due to the armature resistance $V_R = R_a \cdot i_a$, and a voltage drop due to the armature inductance $V_L = L_a \cdot di_a/dt$, which are both linked to the windings of the motor M.

The back electromotive force $e_a$ can, in turn, be decomposed into a d.c. (or mean-value) component $e_{aDC}$ and an a.c. component $e_{aAC}$. In the case where the a.c. component is purely sinusoidal, the two components would be described by the following equations:

$$e_a = e_{aDC} + e_{aAC} \qquad (3)$$

$$e_{aDC} K_e \omega_r = \bar{e}_a \qquad (4)$$

$$e_{aAC} = K_e \omega_r \gamma \sin(N_p \omega_r t) = e_a - e_{aDC} \qquad (5)$$

where $K_e$ is the electric constant of the motor, γ is a coefficient that depends upon the amplitude of the oscillations (ripple) of the electromotive force (emf), $N_p$ is the number of poles of the rotor, and t is time. We thus find that the electromotive force $e_a$ may be proportional to the value of the angular velocity of the rotor $\omega_r$, which means that, by applying a voltage across the terminals A, B of the electric motor M, the latter rotates about its axis (fitted about which is a spindle) with a velocity of rotation $\omega_r$, of its own that is proportional to the value of the back electromotive force $e_a$. It should be noted that the ripple is the result of the a.c. component of the back electromotive force $e_{aAC}$, the period of oscillation T of which is $$T = \frac{2\pi}{N_p \omega_r}$$

It should moreover be noted that a complete rotation of the rotor corresponds to a number of periods of the a.c. component of the back electromotive force $e_{aAC}$ equal to $N_p$; in fact, the theoretical angular position $\theta$ when $t = N_p \cdot T$ is $$\theta(t) = \omega_r t = \omega_r N_p \frac{2\pi}{N_p \omega_r} = 2\pi$$

Figure 4:
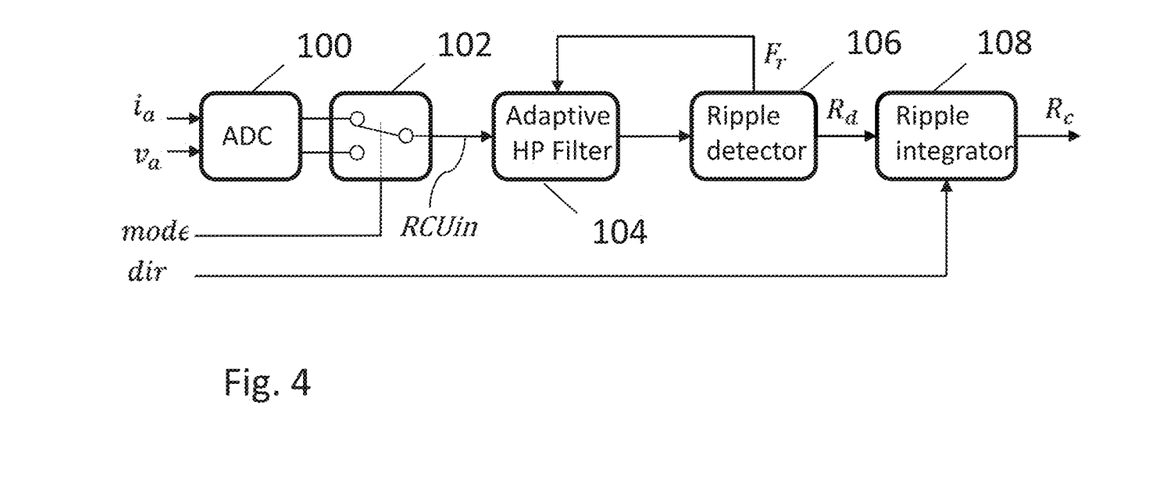
FIG. 4 is a block diagram of a module of the control circuit of the apparatus that implements the method according to the invention.

FIG. 4 represents by way of example a ripple-counter unit RCU. This unit, as highlighted previously, receives at input the values of an armature current $i_a$, a voltage across the motor, for example at the terminals A and B, which, as has been said, in general is the armature voltage $v_a$, but in the regime of interest, i.e., when the engine is off, it is the back electromotive force $e_a$, an operating-mode signal mode (which may be, for example, the voltage MV, or else the current MI, as decided in a selective way by the control unit CU) and the motor-direction signal dir (in one or more embodiments this signal may assume the value +1 or −1 according to the direction of rotation of the motor M). The unit RCU can return at output a variable $R_c$, indicating the number of oscillations of the electrical quantity considered. A purpose of the present invention is to estimate the angular position of the motor by counting the number of periods of the ripple on the input quantities (armature current $i_a$, or else armature voltage $v_a$).

The operating principle of the ripple-counter unit RCU is described below.

An analog-to-digital converter (ADC) 100 samples the electrical quantities at input (armature voltage $v_a$ and armature current $i_a$) and returns them as digital quantities. A switch 102, driven by the signal mode, "chooses" from among the digital electrical quantities at output from the converter 100 an electrical counting quantity RCUin that is used for counting the oscillations of the ripple. The signal mode assumes the value MV, in the case where as electrical counting quantity RCUin the armature voltage $v_a$ is selected, from which the back electromotive force $e_a$ is deduced, and the value I in the case where as electrical counting quantity RCUin the armature current $i_a$ is selected. In one or more embodiments, an adaptive digital filter (Adaptive HP Filter) 104, which receives the electrical counting quantity RCUin, is configured so as to suppress the low-frequency harmonic components of the input quantity, where the cutoff frequency of the filter is controlled linearly by the input signal $F_r$, calculated by a block 106.

The above block 106 represents a ripple detector, which receives at input the filtered electrical digital counting quantity RCUin at output from the filter 104, which presents an oscillation due to the back electromotive force, selected on the basis of the value of the signal mode, and returns a recognition signal $R_d$, which notifies an event of recognition of a period of oscillation that has elapsed. The recognition signal $R_d$ assumes the value 1 ($R_d$=1) in the case where the recognition event occurs, and the value 0 ($R_d$=0) in the remaining period of time. In practice, the recognition signal $R_d$ presents as a signal with pulses that correspond to the events of recognition of oscillation periods that have elapsed; hence, if the counting signal RCUin presents a continuous oscillation for a lapse of time, the recognition signal $R_d$ presents as a train of pulses separated from one another by the oscillation period (which in turn may vary in time).

The ripple detector 106 may be configured for signalling the presence of half-periods, instead of full periods. Again, in this case, the signal $R_d$ presents a pulse $R_d$=1 when a half-period occurs and is equal to 0 otherwise. In this way, the total count value will be twice as high, given that the half-period, instead of the period, is considered.

The ripple detector 106 may be implemented by configuring it so as to seek the local (upper or lower) peaks of the electrical counting quantity RCUin, using an adaptive threshold. The ripple detector 106 moreover determines a frequency $F_r$ of the ripple pulses, which controls the cutoff frequency of the filter 104.

The block 108 represents a ripple integrator that adds or subtracts in a pulse-counting variable $R_c(t)$ the values in time of the input recognition signal $R_d$, supplied at output by the ripple detector 106.

The block 108 computes an addition when the direction signal dir has a value equal to +1 in the case where the window F is coming down (e.g., it is opening), whereas it computes a subtraction when the direction signal dir has a value equal to −1 in the case where the window F is going up (e.g., it is closing). In other words, the integrator block 108 implements the following operation:

$$R_c(t) = R_d dir + R_c(t)$$

The value of the angular position $\theta(t)$ of the motor can hence be deduced from the equation:

$$\theta(t) = \frac{R_c(t)}{N_p}$$

where $N_p$ is the number of poles of the rotor.

Once the above information has been obtained, the linear position of the window can be calculated easily: the origin of the system is, for example, in the highest point that can be reached, i.e., when the window is closed, and its calculated position will be proportional to the value of the angular position $\theta(t)$.

Figure 5:
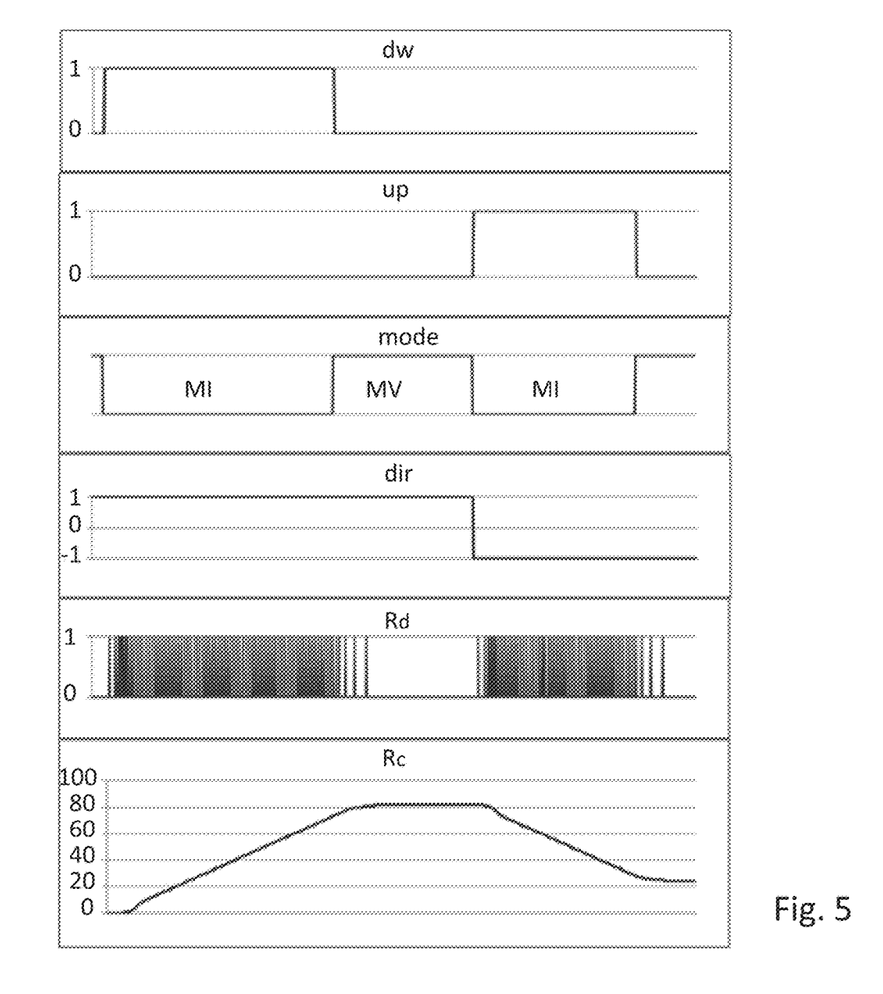
FIG. 5 is a diagram that represents the time plot of different signals for operation of one or more embodiments.

FIG. 5 is provided by way of example of a possible time plot of one or more embodiments and is divided into three temporal portions corresponding to the three operating states of the motor that are exemplified in FIG. 2:

winding-down state, as may be understood from the fact that the signals dw and up have values dw=1 and up=0: the motor M moves the window downwards, for example, opening it, and consequently the signals mode=MI (exemplified in FIG. 5 by the value mode=0) and dir=1 are generated; the pulses observed in the input recognition signal $R_d$ are added, given that the signal dir has a positive value, in the ripple counter unit RCU by incrementing the value of the pulse-counting variable $R_c(t)$;

state of stop of the motor M, as may be understood from the fact that the signals dw and up have values dw=0 and up=0: consequently, the signal mode=MV is generated (exemplified in FIG. 5 by the value mode=1), and the signal dir remains unchanged; the pulses observed in the input signal $R_d$ are added (i.e., the positive or negative value of the signal dir remains unchanged; in fact, the motor in the mode MV does not change the direction of rotation) in the ripple counter unit RCU by incrementing the value of the pulse-counting variable $R_c(t)$—this value increasing more slowly on account of the fact that the motor M is turned off and is hence progressively slowing down; and winding-up state, as may be understood from the fact that the signals dw and up have values dw=0 and up=1: the motor M moves the window upwards, for example, closing it, and the signals mode=MI (exemplified in FIG. 5 by the value mode=0) and dir=−1 are consequently generated; the pulses observed in the input signal $R_d$ are subtracted in the ripple counter unit RCU by decrementing the value of the pulse-counting variable $R_c(t)$.

Figure 6A:
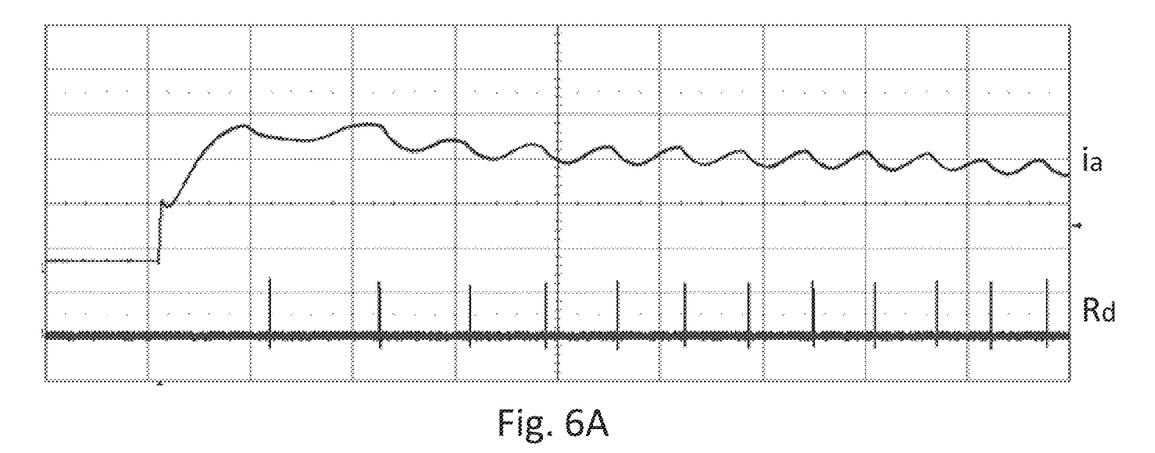
FIGS. 6A and 6B are, respectively, a diagram that represents the time plot of an armature current of a motor in an apparatus operating according to the method of the invention and a diagram that represents the time plot of a back electromotive force in a motor, not supplied, that is running, in an apparatus operating according to the method of the invention.
Figure 6B:
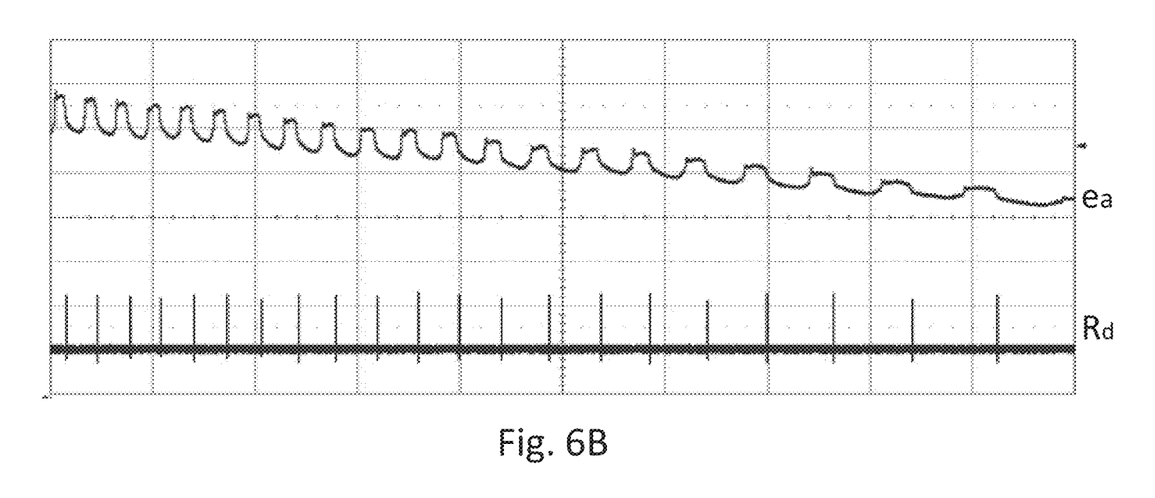

FIG. 6A illustrates a possible plot of the armature current in the case where across the terminals A, B of the motor M a step voltage is applied (mode=MI, current); note the ripple due to the oscillation of the back electromotive force. FIG. 6B shows a plot of the back electromotive force $e_a$ (mode=MV, voltage), which has a similar ripple, on the hypothesis of keeping the supply circuit open and with the rotor of the motor M having a non-zero initial angular velocity $\omega_r$, i.e., with the rotor of the motor M that continues to turn owing to mechanical inertia and hence generates across the motor M, i.e., at the terminals A and B, a back electromotive force proportional to its velocity. It should be noted that, with the passage of time, the oscillation of the back electromotive force becomes progressively less intense, indicating a progressive slowing-down of the motor due to the loss of inertia of rotation of the rotor.

The back electromotive force $e_a$ proves useful when the armature current $i_a$ is not available, for example, in some circuit solutions during the off state (STOP) of the motor. In these cases, the anti-pinch circuit device is configured for making selection (block 102) of the back electromotive force $e_a$ instead of the armature current $i_a$, in particular by implementing a drive of the motor M that makes available for counting the ripple the above back electromotive force (where the mode selected by the control unit CU is MV) in order to estimate the position of the window coupled to the motor M.

The two pulse signals appearing below the oscillating electrical quantities are provided by way of example of a possible time plot of the signal $R_d$.

Figure 7:
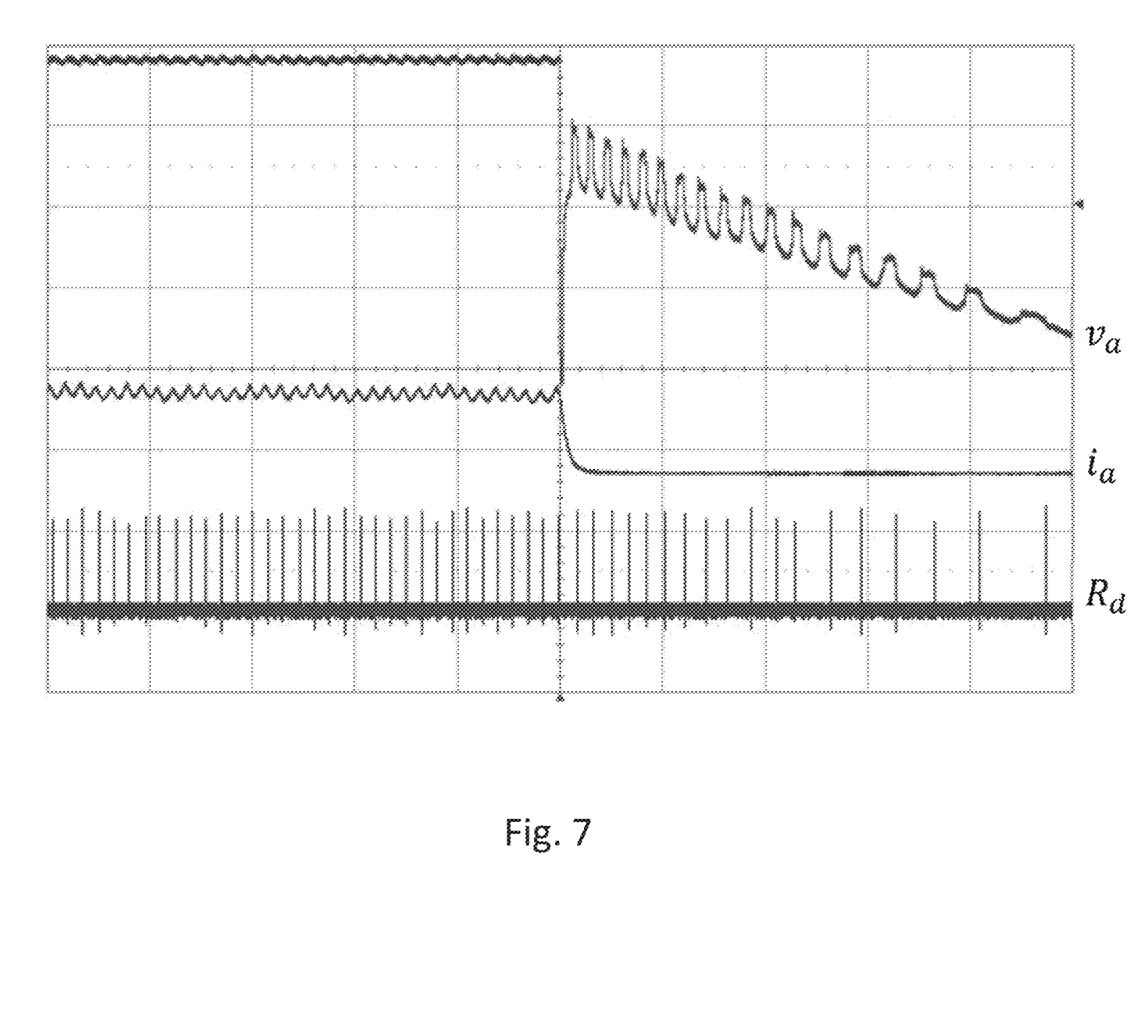
FIG. 7 is a diagram that represents the time plot of various signals for operation of one or more embodiments.

Exemplified in FIG. 7 is the case where there occurs a transition from current mode (mode=MI) to voltage mode (mode=MV) in a circuit embodiment that does not enable observation of the current $i_a$ when the motor M is turning off. In this case, the time plot of three signals is illustrated: the armature voltage $v_a$, the current $i_a$, and the recognition signal $R_d$.

The moment of transition is represented by the moment when the values of the signals up and dw pass to zero, i.e., up=0 and dw=0, a situation that arises when the armature current $i_a$ drops to a zero value, in the case of manual command (issued by a user) or automatic command (in the case where the end-of-travel position is reached) for interruption of the movement of the motor M. In this case, the voltage $v_a$, and more specifically the back electromotive force $e_a$, becomes the signal with respect to which, in the pulse-counting variable $R_c$, the events $R_d$ of period T elapsed are counted. Once again, there may be noted a progressive reduction in frequency of the pulses in $R_d$ once the voltage mode MV is triggered. As has been said, these transitions can be evaluated using a microprocessor that analyses the armature current and voltage.

Figure 8:
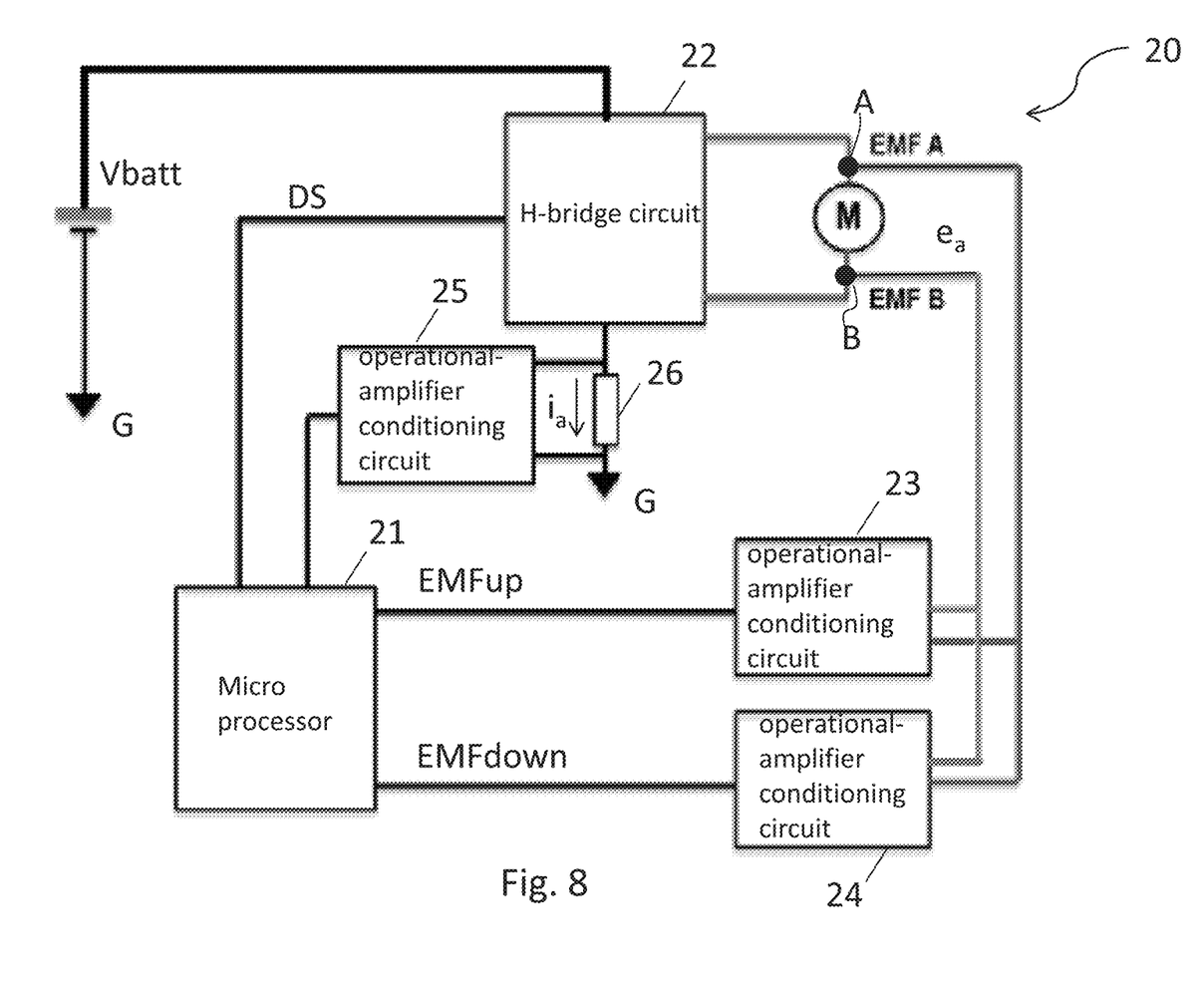
FIG. 8 is a block diagram of a control circuit of the apparatus according to the invention.

Described schematically in FIG. 8 is an embodiment 20 of the anti-pinch circuit device for controlling an apparatus for automatic movement of sliding windows in a motor vehicle, in particular a power-window apparatus, basically comprising a control circuit, which includes a microprocessor 21 that issues control signals, for example, PWM signals, denoted as DS in FIG. 8, with ON time $t_1$ and OFF time $t_2$, to an H-bridge circuit 22, in particular supplied by a battery voltage Vbatt, which drives the electric motor M.

In particular, the control signals represented by the reference DS may comprise the driving signals of the motor M, as well as the control signals of the H-bridge circuit 22. These control solutions are known in the art, and any further explanation herein is deemed superfluous.

Acquired across the terminals A and B of said motor M are respective voltage values EMFA and EMFB, which are sent both to a first operational-amplifier conditioning circuit 23, which computes the subtraction EMFA−EMFB, referred to as upward-displacement signal $EMF_{UP}$, for a revolution of the motor to move the window F upwards and to a second operational-amplifier conditioning circuit 24, which computes the subtraction EMFB−EMFA, referred to as downward-displacement $EMF_{DOWN}$, for a revolution of the motor to move the window F downwards. The signals $EMF_{UP}$ and $EMF_{DOWN}$ are supplied to the microprocessor 21, which receives, via a third operational-amplifier conditioning circuit 25, a current value $i_a$ of the motor, measured via a shunt resistance 26 associated to the H-bridge circuit 22, specifically set between the driving H-bridge circuit 22 and ground G. The armature current $i_a$ of the motor M is calculated by the circuit 25 as ratio of the voltage detected by the circuit 25 across the shunt resistance 26 and the value of the shunt resistance 26 itself.

It should be noted that in one or more embodiments, more economically advantageous variants are possible, in which the active operational-amplifier conditioning circuits 23, 24, which implement operations of subtraction and division on the quantities at their inputs by carrying out such operations, are replaced by passive conditioning circuits, which simply carry out RC filtering. According to the method described with reference to FIG. 4, the circuit device 10 is hence operated in a different operating mode under the control of the signal mode, in the case where no oscillation may be noted on the current $i_a$ to carry out ripple counting, in this different operating mode the third operational-amplifier conditioning circuit 25 reading the back electromotive force $e_a$.

The microprocessor 21 in general incorporates the functional blocks 100, 102, 104, 106, and 108, generating the signal mode on the basis of the values of armature current $i_a$. This signal mode, according to whether it has the current value MI or the voltage value MV, can determine variations in one or more control signals denoted by DS, as will be described more fully in what follows, with reference to FIGS. 9A-9C.

Figures 9A, 9B, 9C:
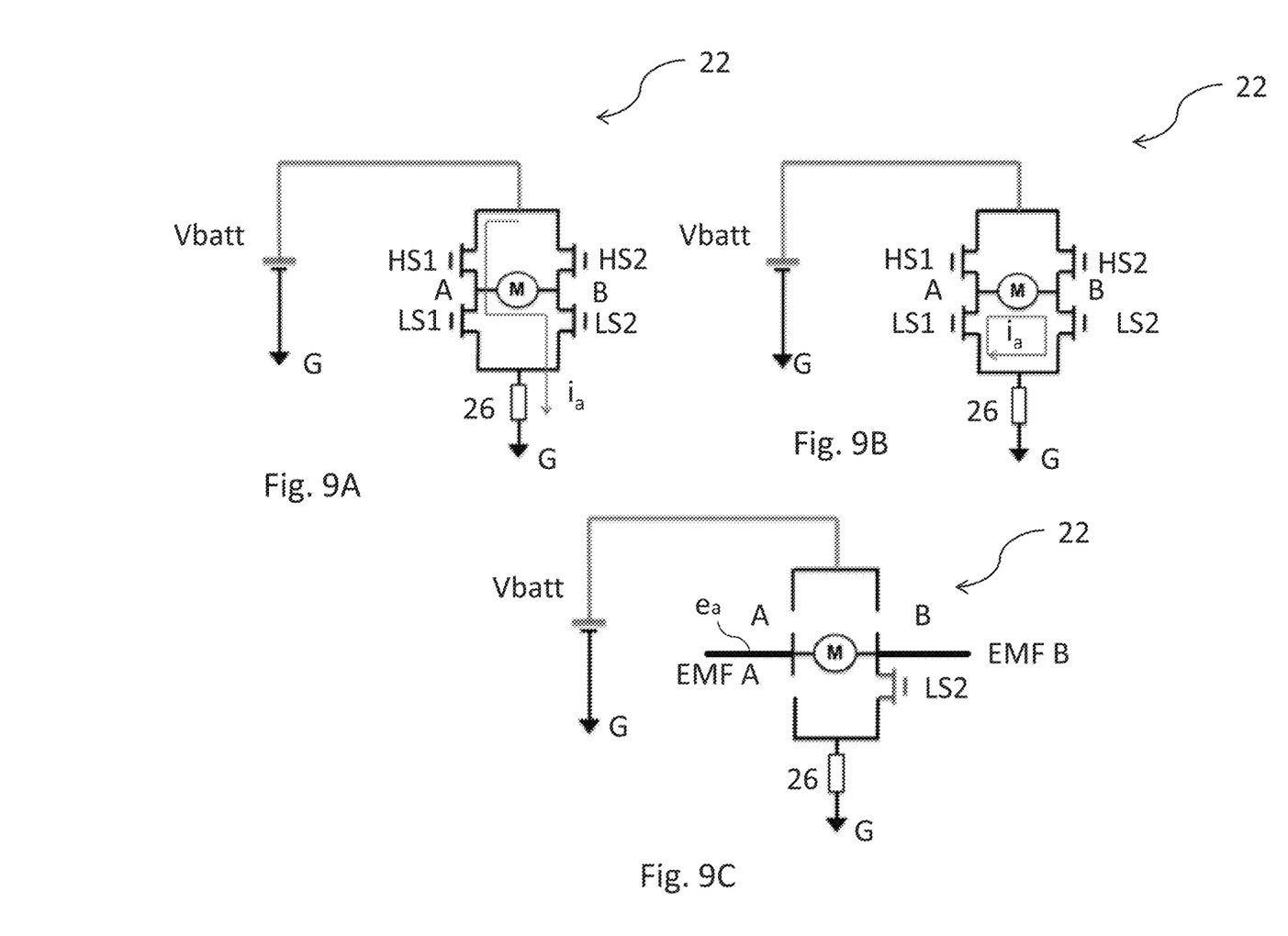
FIGS. 9A, 9B, and 9C illustrate the operating steps of a part of the control circuit of the apparatus that implements the method according to the invention.

FIGS. 9A, 9B, and 9C are in fact provided by way of example of a possible implementation of the H-bridge circuit 22, comprising a first branch and a second branch, associated to respective terminals, in particular A and B, of the motor M, the branches comprising respective low-side switches LS1 and LS2 and high-side switches HS1 and HS2 (e.g., MOSFETs). In particular, FIG. 9A shows the path of the armature current $i_a$ in the H-bridge 22 during movement of the motor M, whereas FIGS. 9B and 9C describe, respectively, the path of the armature current $i_a$ and the point where the information on the back electromotive force $e_a$ is acquired the case where the motor M is turning off.

As may be noted in FIG. 9C, in the case where the motor turning off, it is possible to detect the back electromotive force, i.e., across the terminals A and B, of the motor M by acquiring the voltage values EMFA and EMFB; in particular in FIG. 9C this occurs through acquisition of the voltage EMFA.

For the references that are the same as those of FIG. 8, any further description is deemed superfluous. Instead, designated by the references LS1, LS2, HS1, and HS2 are switches (e.g., MOSFETs), where LS1 is the low-side switch of the first branch, LS2 is the low-side switch of the second branch, HS1 is the high-side switch of the first branch, and HS2 is the high-side switch of the second branch of the H-bridge 22, according to a scheme in itself known in the art, which are activated selectively, via the control signals DS, to enable the motor M to turn in one direction or the other. The arrow in FIG. 9A, for example, indicates the current path for supply of the electric motor M in the case where the switches closed are HS1 and LS2, whereas the switches open are HS2 and LS1. Rotation in the opposite direction occurs when the switches HS2 and LS1 are closed, whereas HS1 and LS2 are open.

The circuit exemplified in FIGS. 9A, 9B, and 9C is characterized in that it has a single shunt for detection of the electrical quantities, specifically of the armature current $i_a$.

As illustrated in FIG. 9C, it may be noted how it is possible, alternatively to the current, to acquire the value of the back electromotive force $e_a$ read across the motor M, by controlling the control signals DS opening of all the switches except for the low-side switch of the second branch LS2, i.e., the low-side switch of the branch not connected to the terminal of the motor M on which the back electromotive force $e_a$ is acquired, in particular via the circuit 25. In this way, it is possible to obtain the angular position of the motor also during turning-off, where a conventional detection method would fail.

The other functional blocks of FIG. 4, as has been said, can be obtained, for example, via the processor 22.

Figures 9D, 9E:
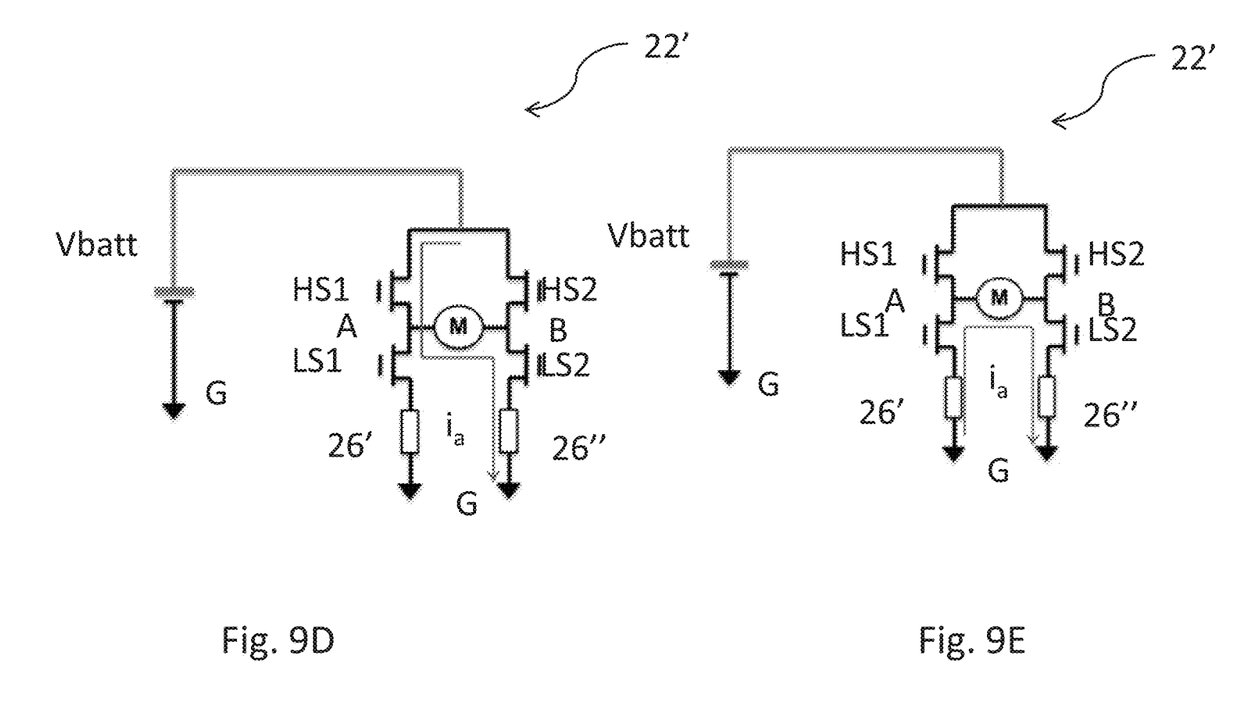
FIGS. 9D and 9E illustrate the operating steps of a part of control circuit of an apparatus according to the prior art.

To understand more fully the advantage afforded by the method according to the invention and by the device that implements it, FIGS. 9D and 9E illustrate an H-bridge 22' that implements a method according to the prior art, where in general the structure is similar and where the same references designate components that are the same, but the shunt module 26 is obtained via two shunts 26' and 26" connected between the respective low-side switches LS1 and LS2 and ground G. The H-bridge 22' hence does not form part of the solutions falling within the scope of the invention described herein. This prior method is conventional, in so far as it uses only the armature current $i_a$ for counting the oscillations of the ripple and does not make it possible, in the case of use of a single shunt, to obtain a continuous control of the position, for example, when the motor is turning off. In fact, the armature current $i_a$ in one of the window-winding states, RUN UP or RUN DOWN, presents a path as exemplified in FIG. 9D, through the high-side switch of the first branch HS1, the motor M, and the low-side switch of the second branch LS2. In a dual way, in the other window-winding state, the condition of the switches is reversed, the armature current $i_a$ passing from the second branch to the first branch in the path towards ground G through the motor M. The two shunts 26' and 26" enable measurement of the armature current $i_a$, and hence calculation of the ripple, also in the operating step of turning-off, where it presents a path as exemplified by the arrow in FIG. 9E. With just one shunt 26, what has been indicated and discussed previously with reference FIG. 9C instead occurs.

Figure 10:
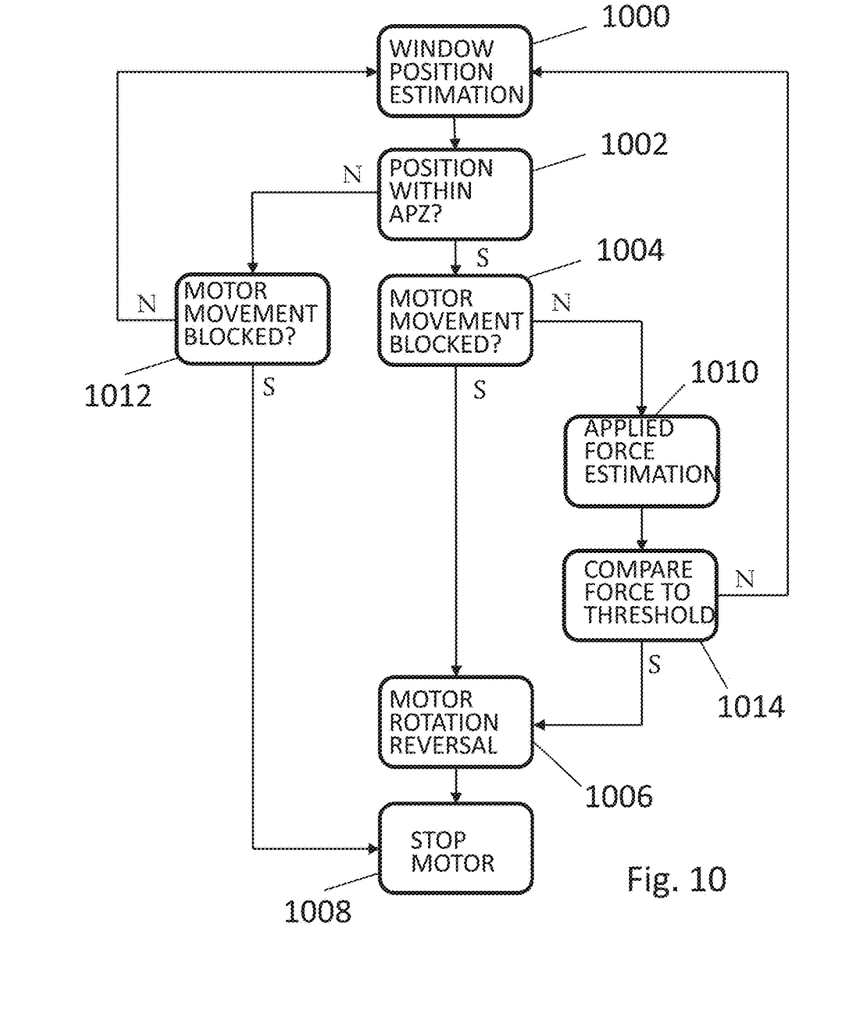
FIG. 10 is a flowchart representing an embodiment of the method according to the invention.

FIG. 10 describes an anti-pinch method, implemented, for example, by a finite-state machine, in the form of flowchart, which takes into account reading of the position of a window F coupled to the motor M and of the torque produced thereby. The anti-pinch method is implemented in one or more embodiments by the microcontroller 21.

The method envisages a first step 1000 of estimation of the position of the window F on the basis of the value of the pulse-counting variable $R_c$ at output from the ripple-counter unit RCU.

A step 1002 estimates whether the position of the window F falls within an anti-pinch zone, and
- if so (Y) and movement of the motor is blocked (step 1004, Y), a step 1006 of reversal of rotation of the motor M is carried out, which inevitably leads to a step 1008 of blocking of the motor M;
- if so (Y) and movement of the motor is not blocked (step 1004, N), in a step 1010 an estimate is made of the force applied against the external obstacle that has caused pinching;
- if not (N) and movement of the motor is blocked (step 1012, Y), the motor M is brought into a blocking state, step 1008; and
- if not (N) and movement of the motor is not blocked (step 1010, N), control returns to the step 1000.

The step 1010 of estimation of the force applied leads to a step 1014, where the estimate is compared with a threshold value; and
- if the estimate does not exceed the threshold value (N, step 1014), then control returns to step 1000;
- if the estimate exceeds the threshold value (Y, step 1014), then control passes to step 1006.

It should be noted that, in one or more embodiments, the estimation of the force applied is necessary in so far as movement of the motor may be blocked partially, and not total, and this should not, however, be considered for the purposes of reversal; for example, the friction of the window as it goes up on account of wear resulting from use should not be considered (below threshold), whereas the force due to deformation of a deformable object that may have remained jammed during closing of the window F should be considered (above threshold).

From the foregoing description, the solution described and its advantages hence emerge clearly.

One or more embodiments hence present the technical advantage of enabling detection of the position of a window F without the use of sensors, hence a sensorless detection, in any circuit condition.

In particular, since the method is based upon various possible electrical quantities, it enables detection of the position also in circuit situations where the armature current proves inappropriate for the purpose.

A circuit example of such an advantage may be represented by the case described where just one shunt is used, instead of two, for detection of the electrical quantities. This leads to an economic saving and a saving in terms of encumbrance on the printed-circuit board or on the integrated circuit.

A conventional method, only based upon the armature current, would not enable a continuous control of the position in some circuit solutions, as in the case of use of a single shunt, for example, during turning-off of the motor, because the current would be substantially zero in this operating step.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An anti-pinch method for an apparatus for automatic movement of sliding windows in a motor vehicle, comprising a d.c. electric motor (M) having operating steps (STOP, RUN UP, RUN DOWN) wherein the motor (M) moves a window (F) so that it slides along guides, said method comprising the steps of:

receiving at least one electrical quantity ($e_a$, $i_a$) of said motor (M);

counting a number ($R_c$) oscillation periods ($R_d$) of said at least one electrical quantity ($e_a$, $i_a$);

calculating an angular position (($\theta(t)$) of the motor (M) as a function of said number of oscillation periods ($R_c$) of the electrical quantity ($e_a$, $i_a$);

calculating a position of the window (F) as a function of said angular position (($\theta(t)$) of the motor (M); and reversing the direction of rotation of the motor (M) if the position of said window (F) falls within an anti-pinch zone (APZ) and the movement of the motor (M) is at least partially blocked, receiving a plurality of electrical quantities ($e_a$, $i_a$) of said motor (M); and selecting the electrical quantity in order to count said number ($R_c$) of oscillation periods ($R_d$) of said electrical quantity in said plurality of electrical quantities ($e_a$, $i_a$) received through a control signal (mode), generated as a function of the operating steps (STOP, RUN UP, RUN DOWN) of the motor (M) comprising a state of arrest (STOP) in which the window (F) is wound up by the motor (M) and in which the window (F) is wound down by the motor (M), said electrical quantity being selected between an armature current ($i_a$) and a back electromotive force ($e_a$) of the motor (M), said back electromotive force ($e_a$) of the motor (M) being selected during said state of arrest (STOP) of the motor (M).

2. The method as set forth in claim 1, comprising counting ($R_c$) half-periods of oscillation ($R_d$) of said at least one electrical quantity ($e_a$, $i_a$).

3. The method as set forth in claim 1, further comprising the steps of:

determining a frequency ($F_r$) of the ripple pulses ($R_d$); and filtering with an adaptive filter with cutoff frequency ($F_r$), which is, in particular, a function of a frequency ($F_r$) of the ripple pulses ($R_d$), the electrical quantities ($e_a$, $i_a$) in order to suppress the low-frequency harmonic components.

4. The method as set forth in claim 1, comprising converting said analog electrical quantities at input into digital electrical quantities.

5. An anti-pinch circuit device for controlling an apparatus for automatic movement of sliding windows in a motor vehicle, comprising a d.c. electric motor (M) that moves a window (F) so that it slides along guides, said device acting to drive said motor (M), wherein said device implements the steps of the method according to claim 1.

6. The device as set forth in claim 5, wherein said anti-pinch circuit device comprises an H-bridge for driving said motor (M) and a module for measuring the current (I) of the electric motor (M) on a shunt path connected to said H-bridge, as well as respective modules for measuring the back electromotive force ($EMF_{UP}$) of the motor (M) during sliding upwards or towards the closing end-of-travel position (CFu) and the back electromotive force ($EMF_{DOWN}$) of the motor (M) during sliding downwards or towards the opening end-of-travel position (CFd) of the window (F).

7. The device as set forth in claim 6, wherein said H-bridge comprises a first branch and a second branch, which are associated to respective terminals (A, B) of the motor (M), comprising respective low-side switches (LS1, LS2) and high-side switches (HS1, HS2), in particular MOSFETs, in which the current paths through said low-side switches (LS1, LS2) of the H-bridge are coupled together, and set between them is a single shunt such as shunt path between the connection to ground (G) and said current paths.

* * * * *